United States Patent

Sylvester et al.

[15] 3,637,998
[45] Jan. 25, 1972

[54] SPEED RATIO MEASURING SYSTEM

[72] Inventors: Robert A. Sylvester, Coraopolis; Ronald W. Young, Beaver, both of Pa.

[73] Assignee: Jones & Laughlin Steel Corporation, Pittsburgh, Pa.

[22] Filed: Mar. 26, 1969

[21] Appl. No.: 810,655

[52] U.S. Cl. .................... 235/92 DN, 235/92 R, 235/92 PE, 235/92 CC, 235/151.32
[51] Int. Cl. ......................................................... B21c 51/00
[58] Field of Search ............. 235/92, 151.13, 151.32, 151.38

[56] References Cited

UNITED STATES PATENTS

| | | | |
|---|---|---|---|
| 3,510,632 | 5/1970 | Strandberg | 235/92 |
| 3,039,685 | 6/1962 | Bagley | 235/132 |
| 3,332,264 | 7/1967 | Bonn | 72/16 |
| 2,315,747 | 4/1943 | Terry | 235/92 QC |

Primary Examiner—Maynard R. Wilbur
Assistant Examiner—Robert F. Gnuse
Attorney—T. A. Zalenski and G. R. Harris

[57] ABSTRACT

A ratio counter provides a measure of the speed ratio of a cooperative pair of work rolls on a reversing roughing mill by counting a preset number of pulses generated by a first pulse tachometer attached to the motor drive shaft of one of the rolls and the number of pulses generated during the same period of time by a second pulse tachometer attached to the motor drive shaft of the other work roll. The output of the ratio counter is applied to the input of a digital printer. The ratio counter supplies the printer with a print command after each ratio measurement, but the printer remains inert until activated by an alarm system. The alarm system functions to activate the printer only when the roll speed ratio falls outside a predetermined range. The alarm system includes a first counter means for counting up to the same preset number of pulses from the first tachometer as does the ratio counter and a second counter means for counting a preselected number of pulses from the second pulse tachometer which number is less than that preset number of pulses. The system also includes a third counter means for counting the number of pulses generated by the second pulse tachometer between the time the second counter reaches said preselected number of pulses and the first counter reaches said preset number of pulses. Means are provided for developing in response to the count present in the third counter at the time the first counter reaches said preset number of pulses an output constituting a representative measure of the ratio of the number of pulses generated by the first pulse tachometer to the number of pulses generated by the second pulse tachometer during the period the first counter is counting up to the preset number; and when that output is outside a predetermined range, the printer is activated.

3 Claims, 2 Drawing Figures

INVENTORS
ROBERT A. SYLVESTER
RONALD W. YOUNG
BY
ATTORNEY

| FIRST POSITION ||| 
|---|---|---|
| TOTAL X COUNT FOR Y=1000 | MEMORY READOUT | VERBAL MEANING |
| 1040 | +3% | +3% < SPEED MISMATCH |
| 1030 | +2% | +2% < SPEED ≤ +3% MISMATCH |
| 1020 | +1% | +1% < SPEED ≤ +2% MISMATCH |
| 1010 / 1000 / 990 | OFF | −1% ≤ SPEED ≤ +1% MISMATCH |
| 980 | −1% | −1% ≤ SPEED < −1% MISMATCH |
| 970 | −2% | −2% ≤ SPEED < −2% MISMATCH |
| 960 | −3% | SPEED < −3% MISMATCH |

| SECOND POSITION ||| 
|---|---|---|
| TOTAL X COUNT FOR Y=1000 | MEMORY READOUT | VERBAL MEANING |
| 1080 / 1070 | +3% | +6% < SPEED MISMATCH |
| 1060 / 1050 | +2% | +4% < SPEED ≤ +6% MISMATCH |
| 1040 / 1030 | +1% | +2% < SPEED ≤ +4% MISMATCH |
| 1020 / 1010 / 1000 / 990 / 980 | OFF | −2% ≤ SPEED ≤ +2% MISMATCH |
| 970 / 960 | −1% | −4% ≤ SPEED < −2% MISMATCH |
| 950 / 940 | −2% | −6% ≤ SPEED < −4% MISMATCH |
| 930 / 920 | −3% | SPEED < −6% MISMATCH |

Fig. 2

SPEED RATIO MEASURING SYSTEM

This invention relates generally to a system for measuring the speed ratio of two moving bodies and recording ratio measurements which exceed or lag a preselected range. More particularly, the invention relates to a digital system for measuring accurately the speed ratio of the working rolls in a typical rolling mill.

It has been discovered that surface defects in steel strip or sheet can be originally formed during the rolling of the steel slab into a breakdown bar. Specifically, it has been found that a speed mismatch between the top and bottom work rolls in a reversing roughing mill can result in the formation of embedded oxides in the breakdown bar. The embedded oxides are retained in the steel surface as it is further processed to strip, where they show up as defects in the strip surface. These defects are particularly evident in tin plate where they appear as minute slivers and are associated with accelerated corrosion of cans in localized ares, mechanical failures in can lids, blisters in lacquer, poor surface appearance and poor solderability.

Should a steel slab be roughed with fire-cracked rolls, hot steel is extruded into the fire cracks during rolling, forming small protrustions on the slab surface. If the roughing mill work rolls are rotating at different speeds, the protrusions are abraded as they disengage from the rolls, capturing a small amount of scale. On subsequent passes or at the finishing stands, the occluded scale is rolled into the surface of the slab, forming an embedded oxide deposit. The problem is alleviated by synchronizing the speeds of the work rolls.

Accordingly, an object of the present invention is to provide a system for noting any disparity in the rotative speeds of a cooperative pair of work rolls on a reversing roughing mill. Another object of the invention is to provide such a system which measures the speed ratio of the work rolls. Still another object of the invention is to provide such a speed ratio measuring system where the speed ratio is recorded only when it exceeds or lags a preselected speed ratio range. Yet another object of the invention is to provide a system for measuring the speed ratio of two moving bodies and for recording ratio measurements falling outside a preselected range.

Briefly, the invention includes a ratio counter which counts a preset number of pulses from a first pulse tachometer attached to the motor drive shaft of one of a pair of roughing mill work rolls and displays the number of pulses counted during the same period from a second pulse tachometer attached to the motor drive shaft of the other work roll. The output of the ratio counter is applied to the input of a digital printer. The counter supplies the printer with a print command after each ratio measurement but the printer remains inert until activated by the alarm section of the system.

When the roll speed ratio falls outside a predetermined range, the alarm section activates the printer and it prints out, for a desired time period, the speed ratio measurement, the time and the pass number. The system thus provides automatic 24 hour surveillance of mill operation and alerts mill personnel when a severe speed mismatch of the work rolls exists. This gives the production personnel an opportunity to take immediate corrective measures.

The invention will now be described in greater detail with reference to the accompanying drawing in which:

FIG. 2 is two charts setting forth the relationship between specific system variables.

Figure 1:
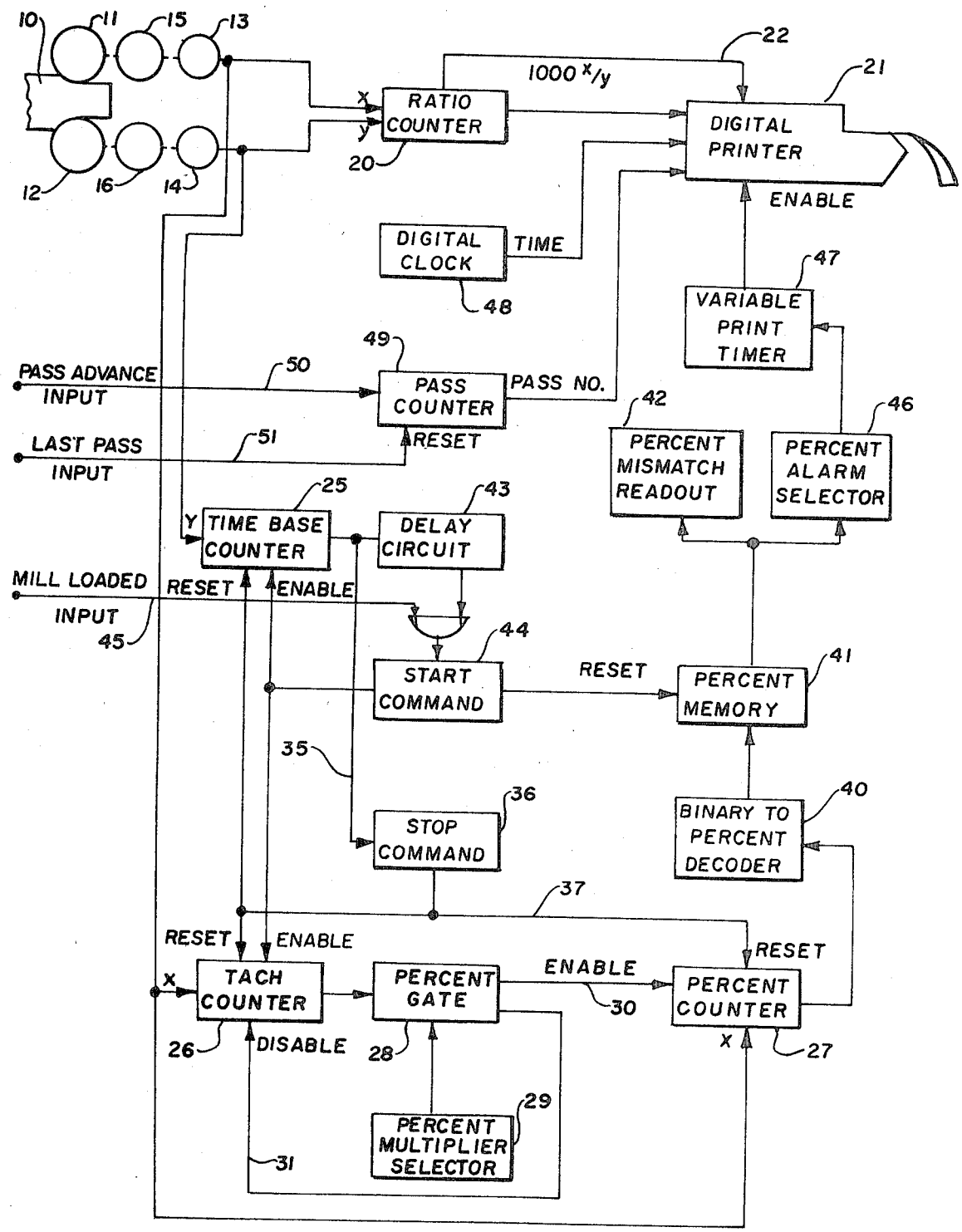
FIG. 1 is a detailed block diagram of the system of the invention.

Referring to FIG. 1, a steel slab 10 is illustrated as passing through a top work roll 11 and bottom work roll 12 of a typical reversing roughing mill. A high resolution pulse tachometer 13 is connected to the roll motor drive shaft 15 driving roll 11 and a similar tachometer 14 is connected to the roll motor drive shaft 16 driving roll 12. The tachometers, of course, generate electrical pulses in response to and at a rate dependent on the speed of the drive shafts and work rolls. The tachometers are connected to the drive shafts through suitable step-up gears in increase the number of pulses generated per shaft revolution, thereby obtaining a more significant measure of the rotative speeds of the drive shafts and their depending work rolls.

The outputs of tachometer 13, referred to herein as X pulses, and tachometer 14, referred to herein as Y pulses, are fed to a commercial ratio counter 20 which develops outputs each of which constitutes a measure of the speed ratio of the work rolls during the generation of a discrete number of pulses, defining a counting period, by a tachometer 14. Thus, ratio counter 20 counts 1,000 pulses from tachometer 14 and displays the number of pulses counted from tachometer 13 during that counting period. The output of the ratio counter, which represents 1,000 X/Y and the speed ratio of the work rolls, is applied to the input of a digital printer 21 for recording of the outputs developed by the ratio counter. The ratio counter supplies the printer with a print or record command via line 22 after each ratio measurement, that is, after each count of 1,000 Y pulses by the ratio counter or at the end of each counting period. The alarm system controls the operation of the printer to render it operative to record the outputs developed by the ratio counter when the speed ratio falls outside a selected range, as will now be described.

Y pulses from tachometer 14 are also fed to time base counter 25, while X pulses from tachometer 13 are also fed to tach counter 26 and percent counter 27. Each of these counters comprise ordinary binary coded decimal counters. Percent gate 28 is operatively connected to tach counter 26 to develop an output upon tach counter 26 counting a prescribed number of X pulses. The prescribed number of pulses, for the system described, may be 920 or 960 and is controlled by means of percent multiplier selector 29. The selector 29 comprises, in effect, a switch which in a first position permits enabling of gate 28 to develop an output when tach counter 26 develops an output corresponding to 960 counted pulses and in a second position permits enabling of gate 28 to develop an output when tach counter 26 develops an output corresponding to 920 counted pulses. The output developed by gate 28 enables percent counter 27 via line 30 and disables tach counter 26 via line 31.

Time base counter 25 counts 1,000 Y pulses in the same period of time ratio counter 20 counts 1,000 Y pulses. Tach counter 26 simultaneously counts X pulses until it has counted 920 or 960 pulses, depending on the positioning of selector 29. Thereafter, X pulses are counted in percent counter 27 until time base counter 25 has counted 1,000 Y pulses, i.e., until the end of the counting period. At that time the carryout of counter 25 is used to develop, through the line 35, a stop command 36 which by means of line 27 resets counters 26 and 27 and disables the latter counter. It will be understood that the number of pulses percent counter 27 counts up until time base counter 25 counts 1,000 Y pulses is a measure of the speed ratio of the working rolls 11 and 12.

Decoder 40, decodes the binary number accumulated in percent counter 27 to indicate the percent speed mismatch of the top roll with respect to the bottom roll. The output of the decoder is applied to percent memory 41, which, each time counter 25 counts 1,000 Y pulses, develops an output measurably responsive to the speed ratio. Memory 41 comprises a series of six gates. When a gate is enabled by the output of decoder 40, a flip-flop associated with the gate is set and, in turn, as associated relay is set. The decoder output is, of course, a function of the binary number accumulated in counter 27 and accordingly will activate the one of the six gates of memory 41 which corresponds to that number. This may be better seen with reference to FIG. 2. The left-hand chart of FIG. 2 corresponds to the condition when selector 29 is in its first position and tach counter 26 is disabled after registering 960 pulses. The left-hand column of the chart lists a series of X pulse values which may be counted while time base counter 25 counts 1,000 Y pulses. The middle column lists the readout values from memory 41 which correspond to the listed X pulse values. The right column lists the verbal meaning of the memory readouts.

It will be understood that when the total X pulse count is 1,040, the accumulated count in counter 27 is 80. Decoder 40 decodes binary 80 to an output which can activate only one of the gates in memory 41 setting an associated flip-flop and relay to provide a memory readout in percent mismatch readout 42 at the $\pm 3\%$ position. The decoder output developed by binary numbers 71 through 80 activates this same gate to provide a readout in the $\pm 3\%$ position, which means that there is a speed mismatch between the top and bottom rolls of more than +3%.

For the decoder output developed by binary numbers 61 through 70 accumulated in counter 27, a second gate is activated setting an associated flip-flop and relay to provide a memory readout in percent mismatch readout 42 at the +2% position. This readout means that the speed mismatch is greater than +2% but less than or equal to +3%. In a similar manner, as indicated on the chart, different ranges of binary numbers accumulated in counter 27 are uniquely related to specific memory readouts which have specific verbal meanings. In the embodiment of the invention described herein, six such bands and associated readouts are provided. There is, of course, a seventh condition and that is the condition when there is no memory readout. This occurs, as shown on the chart, when he speed mismatch is greater or equal to −1%, but less or equal to +1%.

The right-hand chart of FIG. 2 gives the relationship between total X pulse count, memory readout and verbal meaning when the percent multiplier 29 is in the second position, that is, tachometer 26 is disabled after counting 920 X pulses. When selector 29 is placed in its second position, a divide-by-two counter associated with counter 27 is automatically activated. Consequently, when counter 26 reaches 920 and counter 27 enabled, only one-half of the X pulses delivered to counter 27 are registered therein. As a result, under these conditions, a total X pulse count of between 1,061 and 1,080 results in an accumulation of between 71 and 80 in counter 27 and, as shown on the chart, produces a memory readout in the +3% position which, in this case, corresponds to a speed mismatch of +6%. Thus, a particular accumulated count in counter 27 will result in the same memory readout whether selector 29 is in a first or second position, but the verbal meaning is different as shown on the charts of FIG. 2.

The carryout of time base counter 25 is also applied to a 200 millisecond delay circuit 43 which generates a start command, enabling counters 25 and 26 to start counting and resetting memory 41. At the beginning of the rolling of the slab 10 a "mill loaded" signal is delivered through line 45 to generate the start command.

Percent alarm selector switch 46 is operatively connected to memory 41 and variable print timer 47. Upon receiving an input from memory 41, percent alarm selector 46 activates timer 47 to enable printer 21. The printer will continue to record the speed ratios supplied by ratio counter 20 for an interval the duration of which is dependent on the timer setting. The percent alarm selector 46 is wired to memory 41 in such a manner that production personnel can select the roll speed mismatch which alarms the system. For example, if the 2% position of the percent alarm switch is selected, all mismatches greater or equal to +2% and less or equal to −2% will activate the printer.

A digital clock 48 and pass counter 49 are also provided. Their respective outputs are applied to the printer to provide a parallel record of the pass number the slab 10 is undergoing and the time at which the excessive speed mismatch occurs.

The pass counter records the pass numbers from a "pass advance" input delivered through line 50 and is reset by means of a "last pass" input through line 51. The pass advance and last pass inputs, as well as the "mill loaded" input are developed from contact closures of relays in the mill's control system. These relays perform control functions during the breakdown of the slab in the mill. A contact from each of these relays controls an interface relay in the alarm system. The action of the interface relays are in turn utilized to develop a control pulse compatible with the solid state circuitry used in the alarm system.

We claim:

1. Apparatus for measuring the speed ratio of first and second moving bodies comprising first and second means for generating electrical pulses in response to and at a rate dependent on the speed of said first and second moving bodies respectively, ratio measuring means for receiving the pulses developed by said first and second means to develop electrical outputs each of which constitutes a measure of the speed ratio of the two bodies during the generation of a discrete number of pulses, defining a counting period, by one of said pulse generating means, said ratio measuring means including means for issuing a record command to a recording means after each speed ratio measurement, and means controlling the operation of the recording means to render it operative to record the outputs developed by the ratio measuring means when the speed ratio falls outside a selected range, said controlling means comprising memory means for developing at the end of each counting period an output measurably responsive to the speed ratio during the counting period, selector means for delivering the output of the memory means to a means for activating the recording means when that output represents a speed ratio falling outside said selected range, means for counting during each counting period a portion of the pulses generated by one of said first and second means for generating pulses, said portion of the pulses being a measure of the speed ratio during that counting period, and means for applying to said memory means, in the form of electrical inputs, the count in said counting means.

2. Apparatus for measuring the ratio of electrical pulses generated by two pulse-generating means comprising, a first counter means for counting a first preselected number of electrical pulses from a first electrical pulse-generating means, a second counter means for counting a second preselected number of electrical pulses less than said first preselected number from a second electrical pulse-generating means, a third counter means for counting the number of electrical pulses generated by said second generating means between the second counting means reaching said second preselected number and the first counting means reaching said first preselected number, means for developing in response to the count in said third counter means an output constituting a representative measure of the ratio of the number of pulses generated in said first generating means to the number of pulses generated in said second generating means during the period the first counter means is counting up to said first preselected number.

3. The apparatus of claim 2 wherein the carryout of said first counter means is adapted upon reaching the first preselected number to develop a stop command to reset the first, second and third counter means and to be applied to a delay circuit for generating a start command to enable the first and second counter means and reset the memory means.

* * * * *